(12) United States Patent
Nianxiong et al.

(10) Patent No.: US 6,411,136 B1
(45) Date of Patent: Jun. 25, 2002

(54) DIFFERENTIAL LINE DRIVER

(75) Inventors: Tan Nianxiong, Sollentuna; Johan Erlands, Linköping; Jacob Wikner, Linköping, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/259,342

(22) Filed: Mar. 1, 1999

(30) Foreign Application Priority Data

Mar. 2, 1998 (SE) .............................................. 9800635

(51) Int. Cl.$^7$ .............................. H03B 1/00; H05K 3/00
(52) U.S. Cl. ........................ 327/108; 327/110; 326/30; 326/83
(58) Field of Search ...................... 327/108–112, 560, 327/563, 52, 65, 74, 75; 326/30, 82, 83; 330/253

(56) References Cited

U.S. PATENT DOCUMENTS

| | | | |
|---|---|---|---|
| 3,825,682 A | | 7/1974 | Phillips ..................... 178/69 G |
| 5,204,880 A | | 4/1993 | Wurster et al. ................. 375/36 |
| 5,235,617 A | * | 8/1993 | Mallard, Jr. ................. 327/108 |
| 5,331,233 A | | 7/1994 | Urakawa ........................ 327/52 |
| 5,381,112 A | | 1/1995 | Rybicki et al. .............. 330/253 |
| 5,418,478 A | | 5/1995 | Van Brunt et al. ............. 326/86 |
| 5,568,082 A | * | 10/1996 | Hedberg ....................... 327/427 |
| 5,598,119 A | * | 1/1997 | Thayer et al. ................ 327/111 |
| 5,606,281 A | * | 2/1997 | Gloaguen .................... 327/108 |
| 5,684,429 A | * | 11/1997 | Sanwo et al. ................. 327/563 |
| 5,781,040 A | * | 7/1998 | Myers ........................ 327/109 |
| 5,796,278 A | * | 8/1998 | Osborn et al. ............... 327/108 |
| 5,801,549 A | * | 9/1998 | Cao et al. ...................... 330/83 |
| 5,903,173 A | * | 5/1999 | Gottshall et al. ............ 327/108 |
| 5,977,819 A | * | 11/1999 | Sanwo et al. ................. 327/563 |
| 6,008,682 A | * | 12/1999 | Mirov ......................... 327/108 |

OTHER PUBLICATIONS

Khorramabadi, H., A CMOS Line Driver with 80–dB Linearity for ISDN Applications, IEEE Journal of Solid–State Circuits, vol. 27, No. 4, Apr. 1992.

John, David et al., "Integrated Circuits for Data Transmission Over Twisted–Pair Channels", IEEE Journal of Solid–State Circuits, vol. 32, No. 3, Mar. 1997.

* cited by examiner

Primary Examiner—Terry D. Cunningham
Assistant Examiner—Long Nguyen
(74) Attorney, Agent, or Firm—Burns, Doane, Swecker & Mathis, L.L.P.

(57) ABSTRACT

A fully differential line driver, especially for twisted copper pairs. It includes two current amplifiers made in standard CMOS technique, each having an input and an output, the latter being connected via terminal resistors to a voltage source, which may be set to a larger voltage than that used for driving the CMOS amplifiers. Accordingly, a low output impedance can be combined with a large swing. Further, feedback is not necessary, avoiding problems like potential instability. A very low-impedance input makes it appropriate for connecting to a DAC, thus reducing distortion of its output signal. The driver is suitable for very-high-speed-digital-subscriber-line modems.

7 Claims, 2 Drawing Sheets

DIFFERENTIAL LINE DRIVER

This application claims priority under 35 U.S.C. §§ 119 and/or 365 to 9800635-6 filed in Sweden on Mar. 2, 1998; the entire content of which is hereby incorporated by reference.

BACKGROUND

The invention regards a CMOS differential line driver, in particular for driving a line comprising a twisted copper pair, and having a differential input with two input terminals and a differential analog output with two output terminals, which are each provided with a termination resistor. It is intended primarily for use with twisted copper pairs or the like as used for high speed applications, such as high speed internet access.

A traditional type of a fully differential line driver is shown schematically in FIG. 1. The twisted copper pair 1 is fed with power via a transformer 2. In order to obtain impedance matching, the transformed impedance of the twisted copper pair must be matched by termination resistors $R_t$.

A full description of an embodiment of this prior art is given in the article by Khorramabadi, IEEE J. Solid-State Circuits, Vol. 27 No. 4, (1992) p. 539, which is hereby included by reference into the present disclosure. General problems with line drivers are exposed in Johns and Essig, Integrated Circuits for Data Transmission Over Twisted-Pair Channels, IEEE J. Solid-State Circuits, Vol. 32 No. 3 (1997) p. 398.

This known architecture has several drawbacks. The line driver must have a low output impedance and high common-mode rejection, since very high voltage in the copper wire may be coupled back as common-mode signals via parasitic capacitance. The input-dependent variation in the output impedance of the line driver must also be very small in order to have low distortion. Therefore, effective feedbacks are needed in the line driver. Improper compensation in the line driver may result in low signal bandwidth and/or instability.

To deliver a high power to the line driver, a high supply voltage is usually needed.

A line driver of the envisaged type would usually be handling signals from a high speed digital-to-analog converter (DAC) for high speed internet access. It is normal for such high speed DACs to be arranged as current-output devices, meaning that the driving DAC would have a high output impedance. In order to minimize the distortion in the DAC, the input impedance of the line driver must be low.

It is an object of the invention to obtain a fully differential line driver, which obviates the above-mentioned difficulties. Another object is to obtain such a driver which can be made with a standard 5-V CMOS process. This would even enable its integrating with a driving DAC on a single chip. A further object is to obtain very low distortion at high bandwidth without stability problems.

SUMMARY

Said objects and other objects and advantages are obtained, according to the invention, with a line driver of the kind mentioned, and which is provided such (i) that the said input is a current input,
(ii) that the driver comprises two current amplifiers ($A_p$, $A_n$), each forming a said input terminal ($I_{inp}$, $I_{inn}$) and a said output terminal ($I_{op}$, $I_{on}$) respectively, and provided for feeding with a drive voltage ($V_{cc}$).

(iii) that said termination resistors ($R_t$) are connected with first ends to said output terminals ($I_{op}$, $I_{on}$) and have second ends connectible to a drive voltage ($V_{ddh}$).

Typical for the inventive solution is that amplifying circuits are used, which are current amplifying, enabling the obtaining of a low input impedance and a high output impedance. For obtaining high common-mode rejection and impedance matching, termination resistors are arranged.

BRIEF DESCRIPTION OF THE DRAWINGS

The invention shall now be described with reference to the figures, which are to be considered as non-limiting.

DETAILED DESCRIPTION

Figure 2:
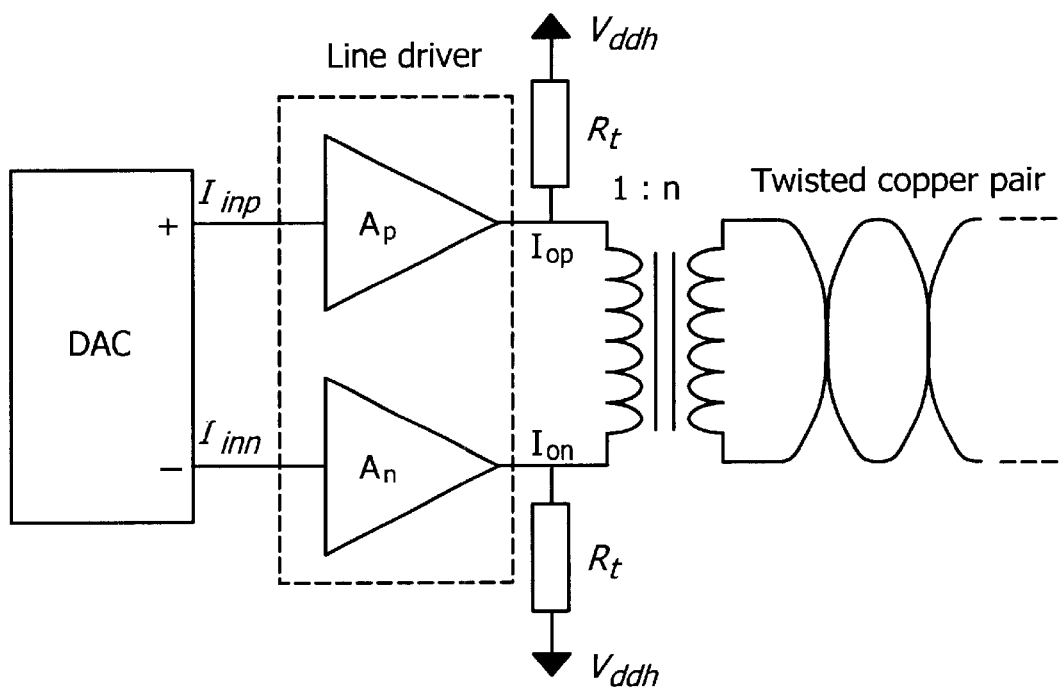
FIG. 2 shows schematically the inventive solution.

The general concept of the invention may be understood from FIG. 2. A line driver is provided with a pair of current inputs $I_{inp}$, $I_{inn}$. The line driver (inside the dashed rectangle) has a pair of current outputs, which are provided with termination resistors $R_t$, connected to drive voltages $V_{ddh}$ and connected to a transformer winding, with another winding connected to a twisted copper pair. As is apparent, there is inside the dashed rectangle a set of two current amplifiers $A_p$ and $A_n$.

Figure 1:
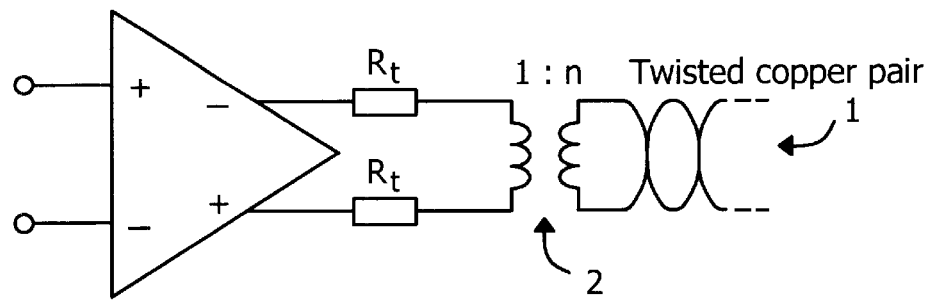
FIG. 1, already mentioned, shows a prior-art line driver.

In order to easily interface with a driving DAC, the line driver itself will have a very low input impedance. Unlike the traditional approach shown in FIG. 1, the proposed line driver has a very high output impedance. Having a low input impedance and a high output impedance, this line driver thus is a current-mode line driver. The termination resistors at the outputs of the line drivers will give high common-mode rejection and impedance matching.

The effective impedance must be equal to the transformed line impedance $Z_t$ for impedance matching. If we assume that the output impedance of the line driver is very large, we have the value of the termination resistor $R_t$ given by $$R_t = 2 \times Z_T = 2 \times Z_l/n^2 \qquad (1)$$

where $Z_T$ is the transformed line impedance, $Z_l$ is the line impedance, and n is the turns ratio of the transformer.

Since the DAC usually uses offset binary codes, the outputs of the DAC, i.e. the input currents to the line driver, can be represented as $$I_{inp} = I_{os} + i_{ac}/2 \qquad (2)$$

$$I_{inn} = I_{os} - i_{ac}/2 \qquad (3)$$

where $I_{os}$ is constant and $i_{ac}$ is the analog representation of the digital input signal of the DAC. Suppose that the line driver has a gain of A for both positive and negative branches, we have the output currents given by $$I_{op} = A \times (I_{os} + i_{ac}/2) \qquad (4)$$

$$I_{on} = A \times (I_{os} - i_{ac}/2) \qquad (5)$$

Suppose the output impedance of the line driver is very large, then the ac current flowing into the transformer is given by $$i_T = K \times A \cdot i_{ac} \qquad (6)$$

where the constant K is determined by the transformed line impedance $Z_T$ and the termination resistance $R_t$, given by $$K=R_t/(2R_t+Z_T) \quad (7)$$

Notice that the constant current $I_{os}$ disappears in equation (6). As a matter of fact, any common-mode signals have no influence on the current flowing into the transformer and equation (7) holds independent of any common-mode signals.

In order to obtain unpeadance matching, equation (1) must be satisfied. Therefore, we have $$K=R_t/(2R_t+Z_T)=2Z_T/(4Z_T+Z_T)=0.4 \quad (8)$$

The power delivered to the line is equal to the power delivered to the transformer and is given by $$P_1=P_t=i_T^2 \times Z_T=K^2 \times A^2 \times i_{ac}^2 \times Z_1/n^2 ==0.16 \times A^2 \times i_{ac}^2 \times Z_1/n^2 \quad (9)$$

This makes it clear that the line driver can be realized by using current amplifiers terminated by resistors. Several advantages are won with such a solution.

Current amplifiers have inherently high bandwidth due to low internal impedance, and therefore this approach is suitable for high speed application. Further, no global feedback is necessary in the current amplifiers, and the line driver may thus be unconditionally stable in the global sense. Another great advantage with the It architecture shown in FIG. 2 is that the supply voltage for the termination resistors can be much higher than the supply voltage for the line driver, in order to accommodate voltage swing at the output. As long as the output voltage swing of the driver is not very large, such that all the transistors within the line driver do not break out, the line driver can be integrated with the DAC in a component made in a standard CMOS process.

It may be noted that the use of an extra supply voltage for the termination resistors is advantageous in that large common-mode signals are directed to this extra supply voltage without disturbing the supply voltages for the DAC and current amplifiers.

A disadvantage would be the power efficiency, since some power is wasted on the termination resistors due to the matching requirement.

In the above discussion, it has been assumed that the output impedance of the current amplifiers are infinite. If the output impedance of the current amplifiers changes dependent on the input current, distortion results. In order to ensure low distortion, a very high output impedance is desirable for the current amplifiers. This can be ensured by proper design.

Figure 3:
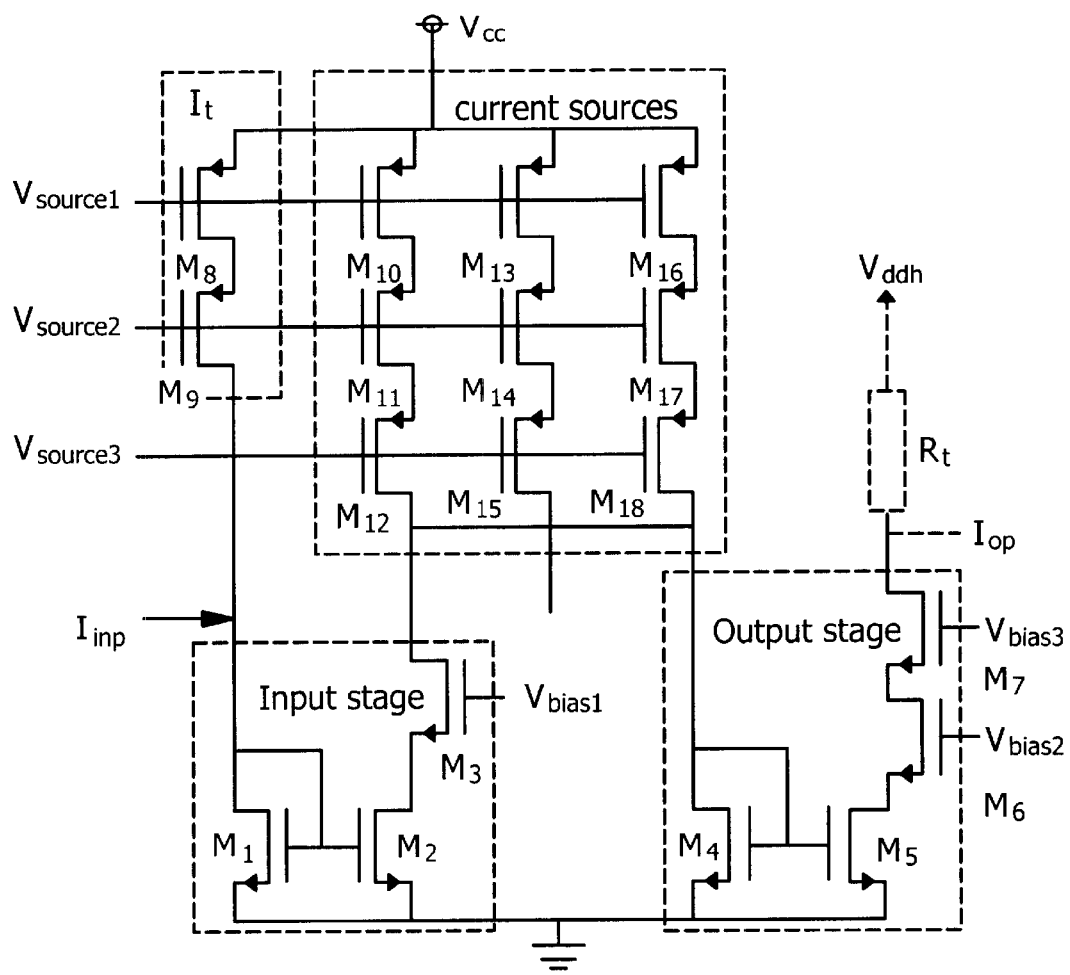
FIG. 3 shows an exemplary embodiment schematically drawn, and applied for the use of a standard 5-V CMOS manufacturing process.

In FIG. 3 is shown an example for a current amplifier, forming one of the amplifiers $A_p$ within the dashed rectangle in FIG. 2. As the amplifier $A_n$ may be rigorously similar, only the first-mentioned current amplifier is shown in FIG. 2, with inputs and outputs shown.

In order to have high signal bandwidth, it is preferable to use only NMOS transistors in the signal path. For obtaining a large gain A, it is preferable to use several stages in cascade in order to maintain the high bandwidth.

The current amplifier consists of two stages, The first stage comprises transistors M1, M2 and M3, and the gain of this stage is determined by the dimension ratio of M2 and M1. The second stage comprises transistors M4, M5, M6 and M7, and the gain of this stage is determined by the dimension ratio of M5 and M4.

All the PMOS transistors M8–M18 are used as bias current sources and provided with proper bias/source voltages. The parallel/serial configuration of PMOS transistors e.g. M10–M18 is an effect of using a standard CMOS process with appropriate maskwork, which is also the feature of arranging the dimension ratios of M2–M1 and M5–M4 respectively, something which is immediately understood by the man of the art knowledgeable in CMOS construction.

Since the output impedance of MOS transistors decreases when the current is increased, double cascodes are used for enabling large currents, as shown in FIG. 3. The input impedance is very low, determined by the transconductance of the input device M1. The output impedance is very high, determined approximately by the product of the output impedance of transistor M5 and the gains of transistors M6 and M7.

It is seen in FIG. 3 that the only transistor that might be broken is M7. As long as its drain voltage is not so large that the gate-drain voltage or drain-source voltage is smaller than its respective break-down voltage, transistor M7 is safe. The whole line driver may therefore be integrated in a standard CMOS process like the 5V CMOS process, and higher supply voltages can be used for the termination resistors.

As a numerical example, the twisted copper pair may have an impedance $Z_1$, of 100 Ω, with the terminal resistances $R_t$, at 50 Ω and n=2.

What is claimed is:

1. A CMOS differential line driver having a differential input with two input terminals and a differential analog output with two output terminals, which are each provided with a termination resistor, wherein:

said input is a current input;

the driver comprises two current amplifiers each coupled to a respective one of said two input terminals, and to a respective one of said two output terminals and provided for feeding with a first drive voltage; and the termination resistors are connected with first ends to said output terminals and have second ends for connection to a second drive voltage, wherein each said current amplifier has an input stage comprising a first current source, a first NMOS transistor connected with its gate and drain to said first current source and its source to a common lead;

a second current source arranged to deliver a larger current than said first current source, a second NMOS transistor connected with its drain to said second current source, with its gate to the gate of the first NMOS transistor and with its source to said common lead;

an output stage comprising a third NMOS transistor connected with its gate and drain to said second current source and its source to said common lead, a fourth NMOS transistor connected with its source to said common lead, with its gate to the gate of said third NMOS transistor and with its drain to an output; and said second NMOS transistor having a larger dimension in the ratio of W/L than said first NMOS transistor, and said fourth NMOS transistor having a larger dimension in the ratio of W/L than said third NMOS transistor.

2. A driver according to claim 1, wherein the current amplifiers are provided for feeding with the first drive voltage, and the second ends of said termination resistors are for connection to the second drive voltage, the second drive voltage being higher than the first drive voltage.

3. A driver according to claim 1, further comprising a transformer having a first winding connected to said output terminals and a second winding having winding terminals for connecting to a symmetric line pair.

4. A driver according to claim 1, wherein said driver drives a line comprising a twisted copper pair.

5. The driver according to claim 1, wherein an input stage of each of the current amplifiers is a biased input stage.

6. The driver according to claim 5, wherein the biased input stage comprises a bias voltage input.

7. The driver according to claim 1, wherein each of the current amplifiers comprises a plurality of transistors.

* * * * *